Figure 1:
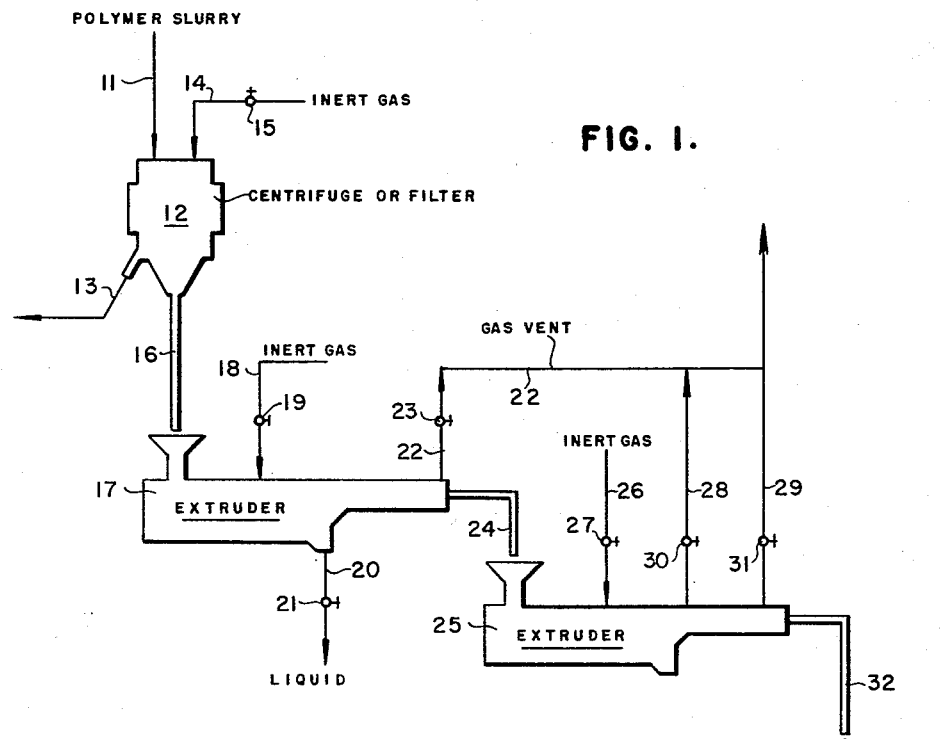

INVENTORS.
HENRY G. SCHUTZE,
DELOS E. BOWN,
BY
ATTORNEY.

2,944,047
LIQUID-SOLID SEPARATION IN OXYGEN-FREE ATMOSPHERE

Henry G. Schutze and Delos E. Bown, Harris County, Tex., assignors, by mesne assignments, to Esso Research and Engineering Company, Elizabeth, N.J., a corporation of Delaware Filed Oct. 2, 1957, Ser. No. 687,777

6 Claims. (Cl. 260—88.2)

The present invention is directed to the treatment of polymers. More particularly, the invention is directed to the production of color-free polymers. In its more specific aspects, the invention is concerned with producing color-free polymers of low surface area.

The present invention may be briefly described as a method of producing color-free solid olefinic polymer from a polymer of high surface area formed in a slurry in a non-polar organic liquid in which liquid is separated from the slurry to recover a partially dried polymer and pressure is applied to remove further quantities of liquid and to reduce the surface area of the polymer, the steps being performed while maintaining the slurry and polymer free of oxygen-containing gas. Thereafter, a polymer having a low surface area is recovered after application of the pressure.

The pressure is applied to the partially dried polymer at a temperature in the range from about 100° to about 400° F. The pressure may be applied in sequence while heating the partially dried polymer. For example, in a first application of pressure, the partially dried polymer may be heated to a temperature in the range from about 100° to about 300° F., while in a second application of pressure, the polymer may be heated to a temperature in the range from about 200° to about 400° F. The pressure applied in both applications may range from about 100 to about 300 pounds per square inch gauge.

Prior to applying pressure to the partially dried polymer, a slurry of the polymer is subjected to a separating means which may be a centrifugation or a filtration operation to remove substantial quantities of the non-polar organic liquid in which the polymer slurry is formed. Other separation means which will remove liquid from a slurry may also be used.

The pressure may be applied to the polymer by extruding or molding the polymer or other pressing operations which will cause a squeezing of the liquid from the polymer. The separation of liquid and the application of pressure are suitably conducted while maintaining the slurry and the polymer free of an oxygen-containing gas. This is preferably accomplished by gas blanketing the separation means and the pressure application means with an inert gas which suitably may be nitrogen, carbon dioxide, helium, and other inert gases which do not react with the polymer or the organic liquid.

Figure 2:
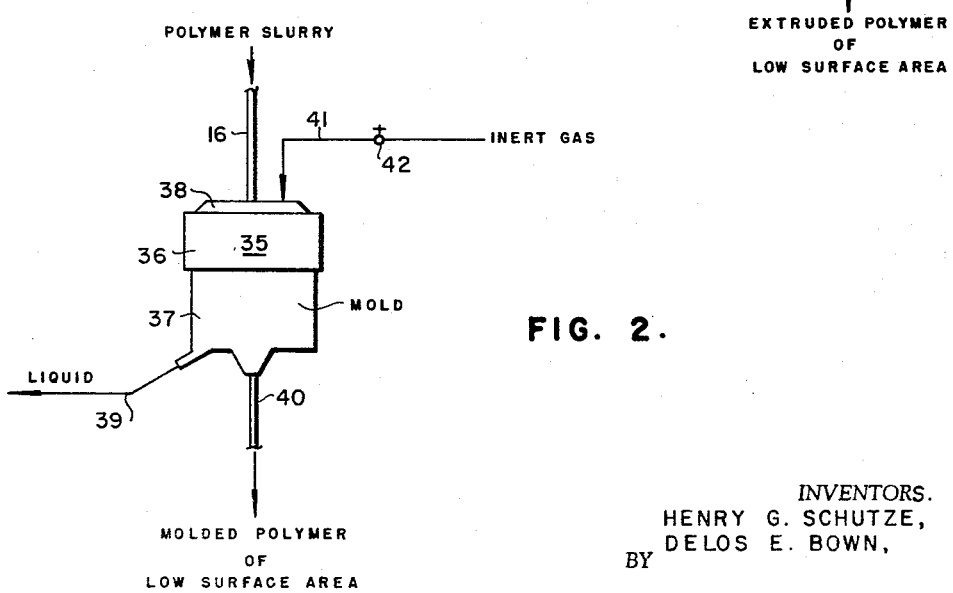

The present invention will be further illustrated by reference to the drawing in which:

Fig. 1 is a flow diagram of a preferred mode in which extruders are employed; and Fig. 2 is a flow diagram of a mode in which a mold is employed.

Referring now to the drawing and particularly to Fig. 1, a polymer slurry from a source not shown is introduced by line 11 into a separation means 12, which suitably may be a centrifuge or filter operated under conditions to remove the organic liquid from the slurry particles by way of line 13. An inert gas of the type mentioned is introduced into the separation means by line 14, controlled by valve 15 to maintain the slurry free of contact with an oxygen-containing gas.

The partially dried polymer is then discharged from separation means 12 by way of line 16 and introduced into a first extrusion zone 17, which may be operated at a temperature in the range from about 100° to about 300° F. and at a pressure in the range from about 100 to about 300 pounds per square inch gauge.

An inert gas may suitably be introduced into extrusion zone 17 by way of line 18, controlled by valve 19. Any non-polar organic liquid remaining in the polymer is discharged from extrusion zone 17 by way of line 20, controlled by valve 21, for recovery and reuse as may be desired.

Gases are suitably vented from extrusion zone 17 by way of line 22, controlled by valve 23, for discharge from the system as will be described further. The extruded polymer may then be discharged by way of line 24 into a second extrusion zone 25 which is similar to extrusion zone 17. In extrusion zone 25, a pressure in the range from about 100 to about 300 pounds per square inch gauge is applied to the polymer at a temperature in the range from about 200 to about 400° F. A gas blanket is maintained on the polymer in zone 25 by introducing an inert gas to zone 25 by way of line 26, controlled by valve 27. Gases are vented from zone 25 by way of lines 28 and 29, respectively, controlled by valves 30 and 31. It is to be noted that line 28 connects into line 22 and line 22 connects into line 29 for discharge of the vented gas from the system. An extruded polymer of low surface area is withdrawn from zone 25 by way of line 32. This polymer is suitable for production of articles, such as squeeze bottles, containers made of polymeric material, and the like. Since the present invention produces a polymer which does not discolor and is of low surface area, the invention is of considerable utility in the manufacture of articles.

Referring now to Fig. 2, polymer slurry such as in line 11 is introduced into a molding zone such as 35 which may be a mold provided with an upper section 36, removable from a lower section 37. The mold may have a movable cover 38 operated by pressure for pressing the polymer slurry introduced by line 16 from the centrifuge 12. Liquid is removed from the slurry in mold 35 by way of line 39 and the molded polymer of low surface area is recovered by way of line 40. An inert gas blanket is maintained on the mold 35 and on the partially dried polymer by introducing inert gas by line 41, controlled by valve 42.

A polymer having high surface area characteristics is described in the following table:

| | | |
|---|---|---|
| Surface area | m.$^2$/g | 32.0 |
| Pore volume | ml./g | 0.115 |
| Average pore diameter | A | 193.8 |
| Pore diameter | A | 200 |
| Pore diameter range | A | 160–260 |

The polymers treated in accordance with the present invention are polymers of mono-olefins having 2 to 5 carbon atoms in the molecule are suitably polyethylene, polypropylene, ethylene-propylene copolymers, ethylene-butene-1 copolymers, ethylene-pentene-1 copolymers, and the like, having molecular weights in the range from about 10,000 to about 1,000,000 and having a surface area when pressed and treated which is less than 1 m.$^2$/g. These polymers are produced by polymerization of the corresponding olefins employing the Ziegler type polymerization catalyst which is obtained by at least partially reducing in solution in a diluent a halide of an amphoteric metal selected from groups IVB, VB, VIB, and VIII of the Periodic System of Elements (see, for example, the Henry D. Hubbard Periodic Chart of the Elements, 1947 ed. revised by W. F. Meegers; W. M. Welch Mfg. Co., Chicago, Ill.). Examples of suitable halides from which the catalyst is prepared are the halides of titanium, zirconium, hafnium, thorium, uranium, vanadium, columbium, tantalum, chromium, molybdenum, tungsten, and mixtures thereof. Exemplary of suitable compounds include titanium tetrachloride, titanium tetrabromide, zirconium tetrachloride, and the like.

In preparing catalysts suitable for use in forming the polymer treated in accordance with the present invention, the amphoteric metal halide is reduced in solution in a non-reactive non-polar organic diluent in any suitable manner such as by means of chemical reaction with a suitable chemical compound having reducing properties, by irradiation, etc. This is done to reduce at least a portion, and preferably more than about 30% of the amphoteric metal halide to a lower valence state. The product of the reduction step, comprising the diluent and the at least partially reduced amphoteric metal halide is employed as the medium in which olefin polymerization is effected.

The diluent to be employed should be a non-reactive, non-polar organic medium in which the amphoteric metal halide starting material is soluble to an extent at least sufficient to provide an 0.1 weight percent solution of amphoteric metal halide starting material. Thus, for example, in preparing the polymerization medium, an 0.1 to 10 weight percent solution of amphoteric metal halide in the diluent may be employed.

Among the diluents that may be employed are saturated aliphatic hydrocarbons, preferably containing from about 5 to 10 carbon atoms per molecule. Specific examples of such diluents include pentane, hexane, heptane, octane, decane, nonane, and mixtures thereof, or other saturated petroleum hydrocarbons. A particularly desirable diluent is n-heptane. It will be understood that other hydrocarbon diluents may be used, such as aromatic diluents (benzene, xylene, etc.), halogenated aromatic hydrocarbons (monochlorobenzene, dichlorobenzene, etc.) gas oil distillate fractions obtained from the catalytic cracking of virgin gas oil feed stocks, Diesel oil, etc. It will be understood that, if desired, mixtures of two or more compatible, miscible diluents may be employed. The diluent should be substantially completely free from oxygen, water and similar compounds of strong polarity which are reactive with the products obtained by reduction of the amphoteric metal halide.

The non-polar organic liquid in which the slurry is formed may suitably be identical with the diluent in which the catalyst is formed for polymerizing the olefinic compounds.

The polymerization reaction is suitably conducted at a temperature in the range from about −60° to about 400° F., preferably at about room temperature. Higher temperatures may be employed, but are generally undesirable in that catalyst decomposition may be encountered. Sub-atmospheric pressures and pressures up to about 250 atmospheres may be employed in forming the polymer treated in accordance with the present invention. It is generally preferable to employ in the polymerization technique a comparatively low pressure, and specifically it is desirable to employ atmospheric pressure. Reaction times of about 60 minutes are required, although reaction time may vary within the range of about 10 minutes to about 24 hours.

As a result of subjecting the olefins of the type illustrated before to treatment with a catalyst of the nature described, olefin polymers are formed having the molecular weights recited which are essentially insoluble in the non-polar organic liquid and forms a slurry of polymerized olefins in the non-polar organic liquid. It is this slurry after quenching to deactivate any catalyst which is treated in accordance with the present invention since the polymer particles are in a finely divided state, have a high surface area, and rapidly adsorb oxygen.

The present invention is quite important in that polymers of the nature of polyethylene, such as low pressure polyethylene, have a very high surface area, and when exposed to air, such as during filtration, drying and storing, rapidly adsorb oxygen. The oxygen is not readily removable, such as for example by applying heat and subjecting the polymer to sub-atmospheric pressure. When the oxygen-containing polymer, such as polyethylene, is subjected to high temperatures and pressures, as it is when extruded or molded, the compounds resulting from the decomposition of oxygen causes cross-linking and degradation of the polymer which ultimately results in darkening or discoloration thereof. This decomposition does not occur appreciably at room temperature.

In accordance with the present invention, the polymer, such as polyethylene, and the like, is never exposed to oxygen from any source during its recovery and processing. Thus, the polymer is subjected to pressure and heat treatment in the absence of oxygen to provide an oxygen-free polymer of low surface area which does not darken or discolor when extruded, molded, or further treated. This is an important finding in that the polymers, such as polyethylene, are now producible substantially free of color and having a low surface area.

The nature and objects of the present invention having been completely described and illustrated, what we wish to claim as new and useful and secure by Letters Patent is:

1. A method of producing color-free solid olefinic polymers from polymer particles of a mono-olefin having 2 to 5 carbon atoms in the molecule, said polymer having a molecular weight in the range from about 10,000 to about 1,000,000 formed in a slurry in a non-polar organic liquid which comprises the steps of separating said liquid from said slurry to recover said polymer particles, then applying pressure by squeezing said polymer particles to remove any of said liquid from and to reduce the surface area of the polymer to less than 1 m.$^2$/g., said steps being performed while maintaining said slurry and polymer particles free of oxygen-containing gas, and recoverying said polymer free of oxygen-containing gas and having a low surface area less than 1 m.$^2$/g. after application of said pressure, said low surface area polymer remaining substantially free of color on further treatment.

2. A method in accordance with claim 1 in which the pressure is applied by extrusion of said polymer particles.

3. A method in accordance with claim 1 in which the pressure is applied by molding said polymer particles.

4. A method in accordance with claim 1 in which the slurry and polymer are maintained free of oxygen-containing gas by blanketing said slurry and polymer during said steps with an oxygen-free inert gas.

5. A method of producing color-free solid olefinic polymer from polymer particles of a mono-olefin having 2 to 5 carbon atoms in the molecule, said polymer having a molecular weight in the range from about 10,000 to about 1,000,000 formed in a slurry in a non-polar organic liquid which comprises the steps of separating said liquid from said slurry to recover said polymer particles, applying pressure in the range from about 100 pounds to about 300 pounds per square inch by squeezing said polymer particles while heating said polymer particles to a temperature in the range from about 100° to about 400° F. to remove any of said liquid from and to reduce the surface area of the polymer to less than 1 m.$^2$/g., said steps being performed while maintaining said slurry and polymer particles free of oxygen-containing gas and recovering said polymer free of oxygen-containing gas and having a low surface area less than 1 m.$^2$/g. after application of said pressure, said low surface area polymer remaining substantially free of color on further treatment.

6. A method in accordance with claim 5 in which the slurry and polymer are maintained free of oxygen-containing gas by blanketing said slurry and polymer during said steps with an oxygen-free inert gas.

References Cited in the file of this patent

UNITED STATES PATENTS

| | | |
|---|---|---|
| 2,045,651 | Hill | June 30, 1936 |
| 2,771,689 | Bettes | Nov. 27, 1956 |
| 2,776,274 | Cairns | Jan. 1, 1957 |
| 2,825,721 | Hogan et al. | Mar. 4, 1958 |
| 2,833,750 | Vickers | May 6, 1958 |
| 2,834,754 | Hatch et al. | May 13, 1958 |

FOREIGN PATENTS

| | | |
|---|---|---|
| 538,782 | Belgium | Dec. 6, 1955 |

OTHER REFERENCES

Renfrew et al.: Polythene, page 194, Iliffe & Sons Ltd. (London, July 13, 1957).

Modern Plastics Encyclopedia, issue for 1959 (September 1958), vol. 36, No. 1A, page 773.